(12) United States Patent
Chen et al.

(10) Patent No.: US 8,493,668 B2
(45) Date of Patent: Jul. 23, 2013

(54) MICRO-PROJECTION LENS

(75) Inventors: Chun-Hong Chen, Taichung (TW); Yu-Hsiang Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 13/307,469

(22) Filed: Nov. 30, 2011

(65) Prior Publication Data

US 2012/0162786 A1 Jun. 28, 2012

(30) Foreign Application Priority Data

Dec. 28, 2010 (TW) ................ 99146444 A (51) Int. Cl.
*G02B 3/02* (2006.01)
*G02B 9/12* (2006.01)

(52) U.S. Cl.
USPC ........ 359/716; 359/651; 359/740; 359/784; 359/785

(58) Field of Classification Search
USPC .................. 359/651, 716, 740, 784–785
See application file for complete search history.

(56) References Cited

U.S. PATENT DOCUMENTS

2010/0315726 A1* 12/2010 Wang et al. .................. 359/767

* cited by examiner

*Primary Examiner* — Evelyn A. Lester
(74) *Attorney, Agent, or Firm* — Tracy M. Heims; Apex Juris, pllc (57) ABSTRACT

The present invention provides a micro-projection lens including first lens group, a second lens group, and a third lens group arranged in sequence along an optical axis from a screen side to a light modulator side. The first lens group has positive refractive power and includes at least an aspheric lens. The second lens group has negative refractive power and includes at least a glass tablet. The third lens group has positive refractive power and includes at least an aspheric lens. Therefore, the micro-projection lens of the present invention has a small size and high optical performance.

12 Claims, 12 Drawing Sheets

MICRO-PROJECTION LENS

BACKGROUND OF THE INVENTION

1. Field of the Invention

The present invention relates generally to a lens, and more particularly to a micro-projection lens.

2. Description of the Related Art

As the progress of technology, projectors are more and more popular in conference, video conference or watching movies. For portability of the projector, a micro-projector, which is small and light, had been presented in market. A lens for the micro-projector, it has to be smaller and lighter than the conventional projection lens, and furthermore, it must have high resolution and high contract to provide high optical performance. Therefore, small size and high optical performance are two important facts for lens of the micro-projector.

Conventional lenses for the micro-projector usually have a plurality of lens groups to obtain high optical performance. Some of them have more than ten lenses, however, this kind of lens has high optical performance, but is big and heavy. It is a trade-off between the size and optical performance in the lens for micro-projector.

SUMMARY OF THE INVENTION

The primary objective of the present invention is to provide a micro-projection lens, which has a small size and a high optical performance.

According to the objective of the present invention, the present invention provides a micro-projection lens including first lens group, a second lens group, and a third lens group arranged in sequence along an optical axis from a screen side to a light modulator side.

In order to have a great image quality, the first lens group has positive refractive power and includes at least an aspheric lens.

In order to raise imaging quality, the second lens group has negative refractive power and includes at least a glass tablet.

In order to reduce chromatic aberration, the third lens group has positive refractive power and includes at least an aspheric lens.

DETAILED DESCRIPTION OF THE INVENTION

Figure 1:
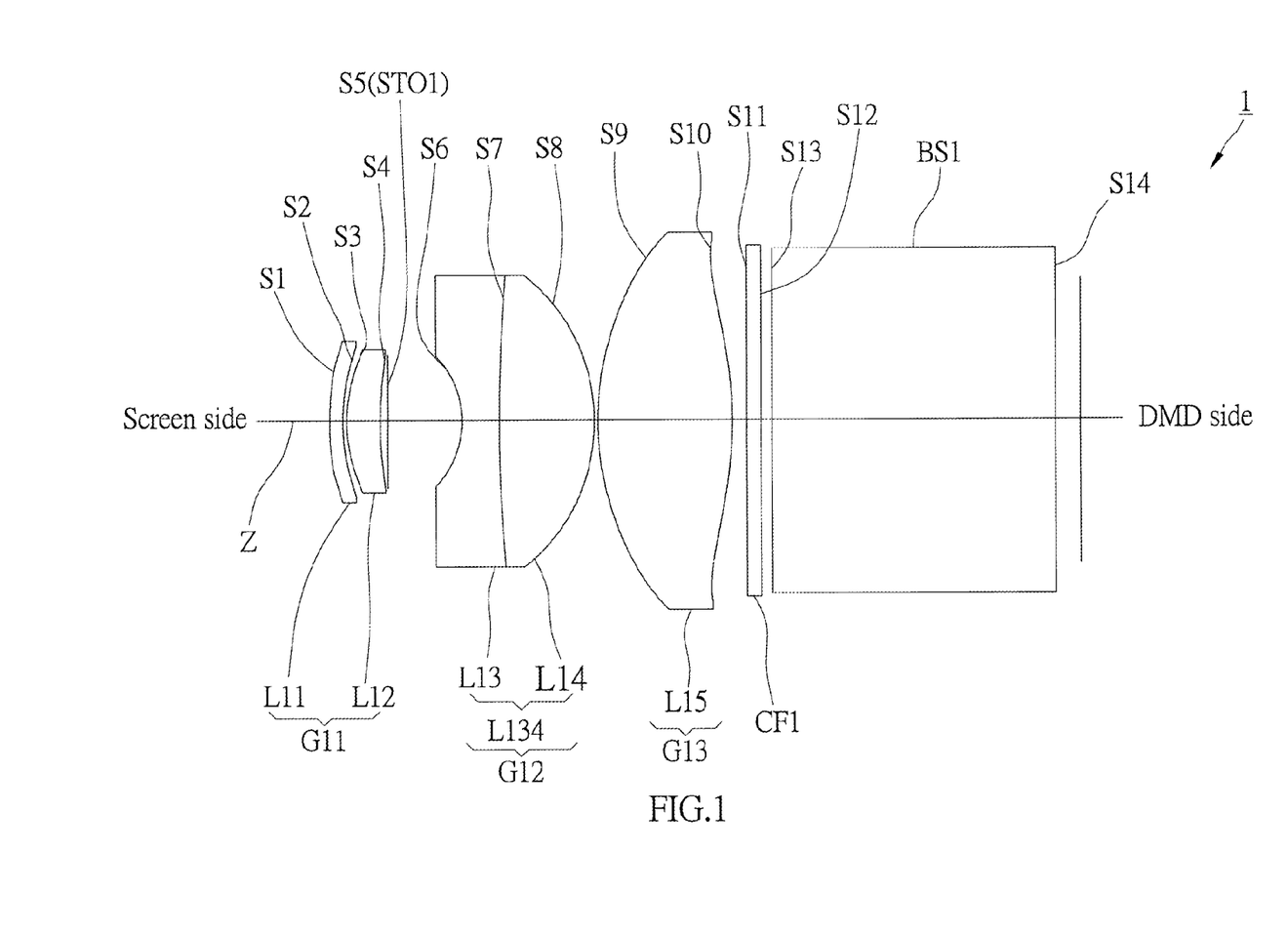
FIG. 1 is a sketch diagram of the arrangement of the lenses of a first preferred embodiment of the present invention.
Figure 2:
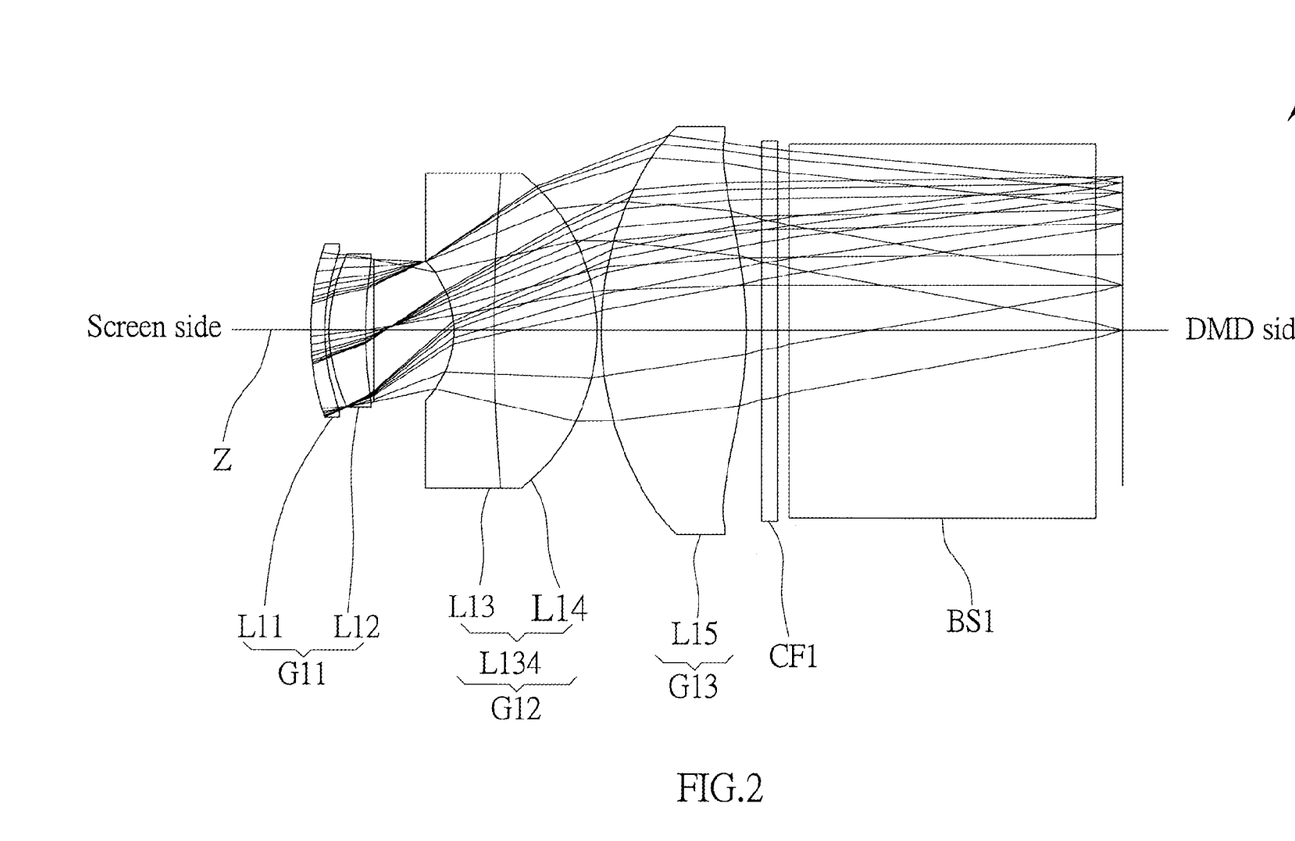
FIG. 2 is a sketch diagram of light path of the first preferred embodiment of the present invention.

FIG. 1 is the arrangement of a micro-projection lens 1 of the first preferred embodiment of the present invention, and FIG. 2 is the light path of FIG. 1. As shown in FIG. 1 and FIG. 2, the micro-projection lens 1 of the first preferred embodiment of the present invention includes:

The micro-projection lens 1 of the first preferred embodiment of the present includes, along an optical axis Z from a screen side to a light modulator (DMD) side, a first lens group G11, an aperture STO1, a second lens group G12, and a third lens group G13.

The first lens group G11 has positive refractive power and includes a first lens L11 and a second lens L12. The first lens L11 is a plastic, aspheric, and meniscus lens with negative refractive power. The first lens L11 has a convex surface S1 facing the screen side and a concave surface S2 facing the DMD side. The convex surface S1 and the concave surface S2 are aspheric. The second lens L12 is a plastic, aspheric, and meniscus lens with positive refractive power. The second lens L12 has a convex surface S3 facing the screen side and a concave surface S4 facing the DMD side. The convex surface S3 and the concave surface S4 are aspheric. The second lens L12 leads the positive refractive power of the first lens group G11. The first lens L11 and the second lens L12 further have the following condition to improve image quality and reduce chromatic aberration:

$$0.4 < f2/F12 < 0.08$$

wherein:

f2: effective focus length of the second lens L12; and

F12: composite focus length of the first lens L11 and the second lens L12.

The second lens group G12 has negative refractive power and includes a third lens L13 and a fourth lens L14. The third lens L13 is a glass lens with negative refractive power, and the fourth lens L14 is a glass lens with positive refractive power. The third lens L13 leads the negative refractive power of the second lens group G12. The third lens L13 and the fourth lens L14 are bonded together to form a doublet L134 with negative refractive power. The doublet L134 has the following condition to reduce chromatic aberration and beam expansion:

$$0.1 < f3/F34 < 0.5$$

wherein:

f3: effective focus length of the third lens L13; and

F34: composite focus length of the doublet L134.

The third lens group G13 includes a fifth lens L15, which is a plastic lens with positive refractive power, and both surfaces S9, S10 of which are aspheric. The third lens group G13 may enhance imaging of the first lens group G11 and correct field curvature and astigmatism to raise the image quality of the micro-projection lens 1 of the present invention.

In addition, the micro-projection lens 1 is further provided with a color filter CF1 and a beam splitter BS1 between the third lens group B13 and the screen side. They are common in the prior art, so we do not describe the detail here.

Table 1 shows focus length (F), F-number (Fno), radius of curvature of the lens at the optical axis (R), thickness of the lens at the optical axis (T), refractive index (Nd), and the Abbe number (Vd) of the micro-projection lens 1 of the first preferred embodiment:

TABLE 1

F = 1 mm Fno = 1.87

| Surface | R(mm) | T(mm) | Nd | Vd | Note |
|---|---|---|---|---|---|
| OBJ | ∞ | 85 | | | |
| S1 | 1.3988 | 0.0505 | 1.5346 | 56.0722 | L11 |
| S2 | 0.7772 | 0.0137 | | | |
| S3 | 0.4796 | 0.1273 | 1.6142 | 25.5765 | L12 |
| S4 | 1.2118 | 0.0275 | | | |
| S5 | 0 | 0.281 | | | STO1 |
| S6 | −0.3314 | 0.1403 | 1.8081 | 22.7608 | L134 |
| S7 | 5.8649 | 0.392 | 1.8348 | 42.7137 | |
| S8 | −0.6727 | 0.0137 | | | |
| S9 | 1.0354 | 0.5072 | 1.5346 | 56.0722 | L15 |
| S10 | −1.3539 | 0.0549 | | | |
| S11 | ∞ | 0.0549 | 1.5069 | 63.1283 | CF1 |
| S12 | ∞ | 0.0412 | | | |
| S13 | ∞ | 1.0711 | 1.544 | 56.2 | BS1 |
| S14 | ∞ | 0 | | | |

In the present embodiment, the depths of aspheric surfaces S1, S2, S3, S4, S9, and S10 may be obtained by the following equation:

$$z = \frac{ch^2}{1 + [1 - (k+1)c^2h^2]^{\frac{1}{2}}} + Ah^4 + Bh^6 + Ch^8 + Dh^{10} + Eh^{12} + Fh^{14} + Gh^{16}$$

Wherein:
z: depth of aspheric concave surface;
c: reciprocal of radius of curvature;
h: radius of aperture of surface;
k: conic constant; and
A~G: coefficient of the radius of aperture of surface.

Table 2 shows the conic constants k of the aspheric surfaces and the coefficients A~G of the radius of aperture of surface h:

TABLE 2

| Surface | S1 | S2 | S3 | S4 | S9 | S10 |
|---|---|---|---|---|---|---|
| K | 18.06013 | 5.887988 | −4.91669 | −0.40475 | 0.631234 | −0.87562 |
| A | 4.422165 | −0.53822 | 0.847186 | −1.61333 | −0.21466 | 0.336144 |
| B | −48.115 | −15.6236 | 0 | 0 | 0.279976 | 0.026312 |
| C | 102.096 | −103.981 | 0 | 0 | −0.4814 | 1.023267 |
| D | 796.3909 | −4448.82 | 0 | 0 | −0.88204 | −2.81254 |
| E | −18767.3 | 22847.17 | 0 | 0 | 3.414232 | 2.365793 |
| F | 19959.34 | 365518.4 | 0 | 0 | −2.38517 | 3.899506 |
| G | −506023 | −9192814 | 0 | 0 | 0.631234 | −0.97562 |

With the arrangement of the lenses and the aperture, the micro-projection lens 1 of the first preferred embodiment is small in size and has a good image quality. The detail data are shown in FIG. 3A to FIG. 3C.

Figure 3A:
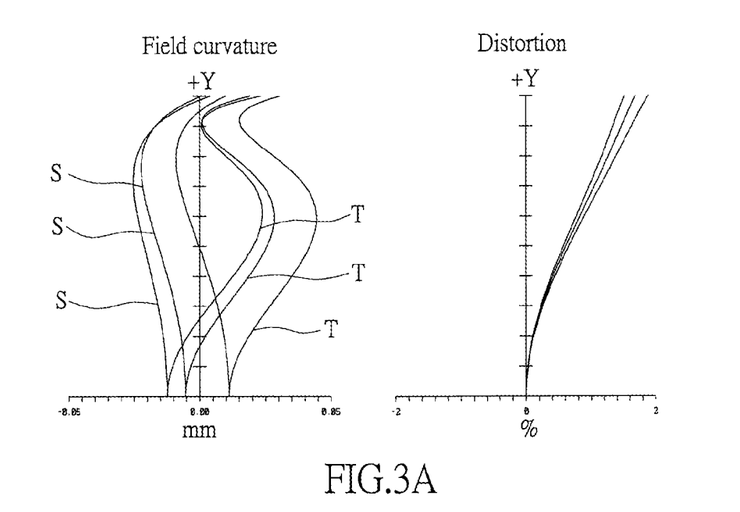
FIG. 3A is a field curvature diagram and a distortion diagram of the first preferred embodiment of the present invention.
Figure 3B:
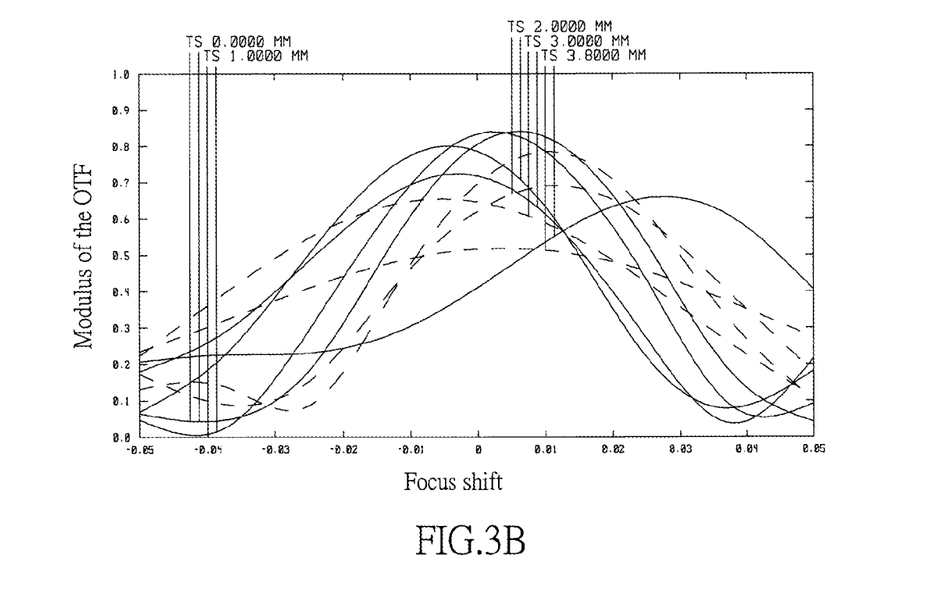
FIG. 3B is a through focus MTF diagram of the first preferred embodiment of the present invention.
Figure 3C:
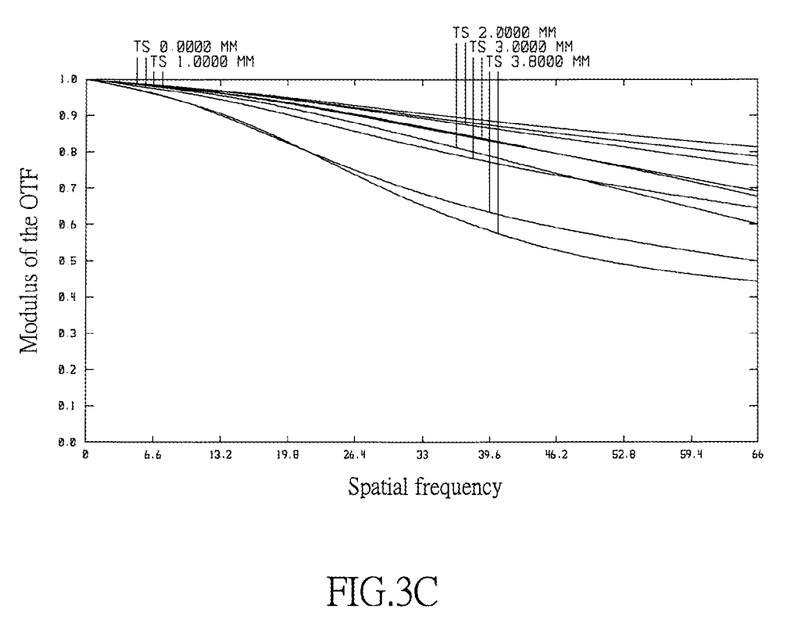
FIG. 3C is a spatial frequency MTF diagram of the first preferred embodiment of the present invention.

FIG. 3A is a field curvature diagram and a distortion diagram of the first preferred embodiment of the present invention; FIG. 3B is a through focus MTF diagram of the first preferred embodiment of the present invention; and FIG. 3C is a spatial frequency MTF diagram of the first preferred embodiment of the present invention. In FIG. 3A, the maximum field curvature is between 0.08 mm and −0.04 mm, and the distortion is under 2%. In FIG. 3B, it shows that the micro-projection lens 1 of the first preferred embodiment has a good resolution from any field of view. In FIG. 3C the spatial frequency MTF still is greater than 50% in 66 lp/mm. The results show the resolution of the micro-projection lens 1 of the first embodiment of the present invention is qualified.

Figure 4:
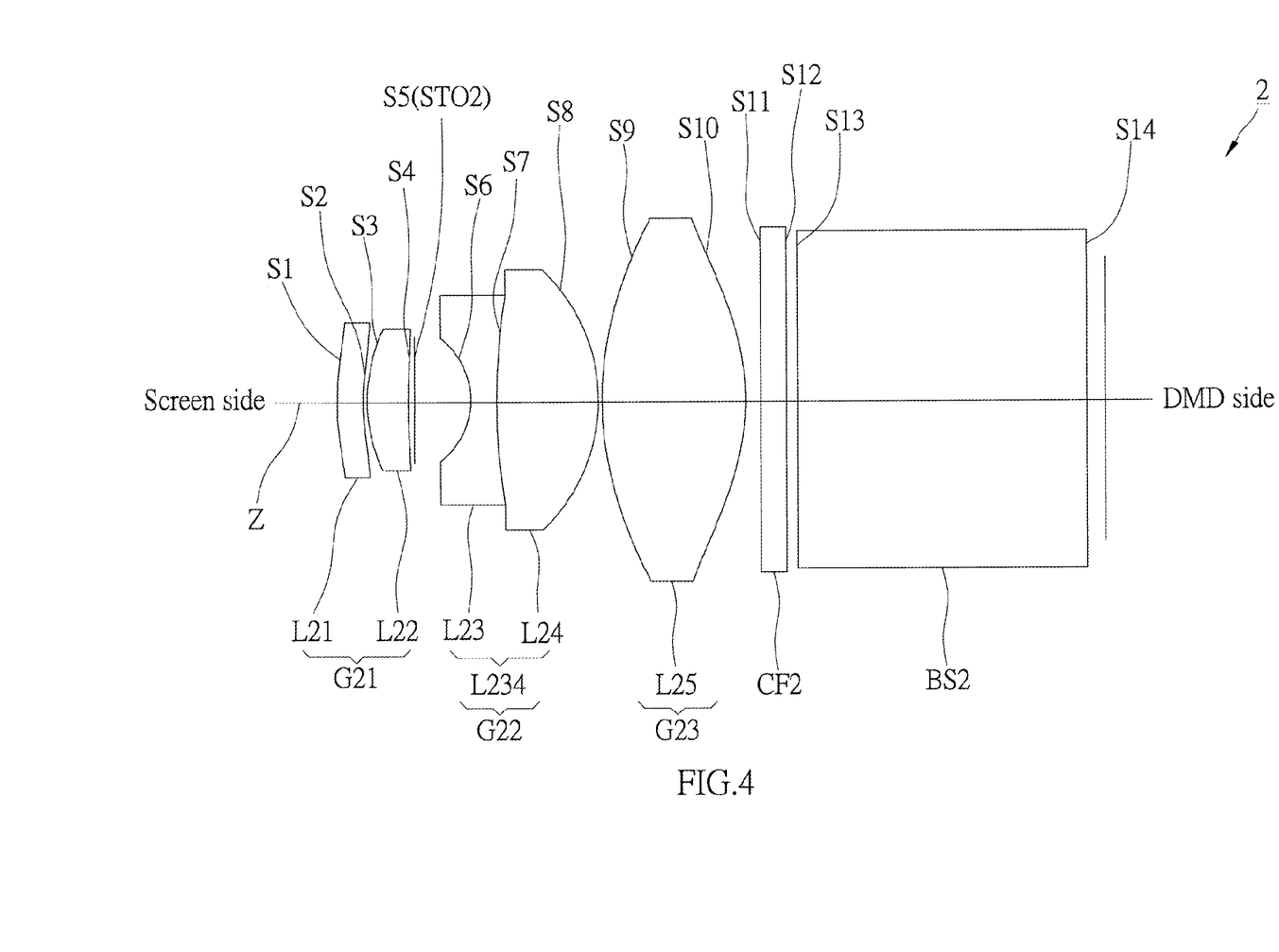
FIG. 4 is a sketch diagram of the arrangement of the lenses of a second preferred embodiment of the present invention.
Figure 5:
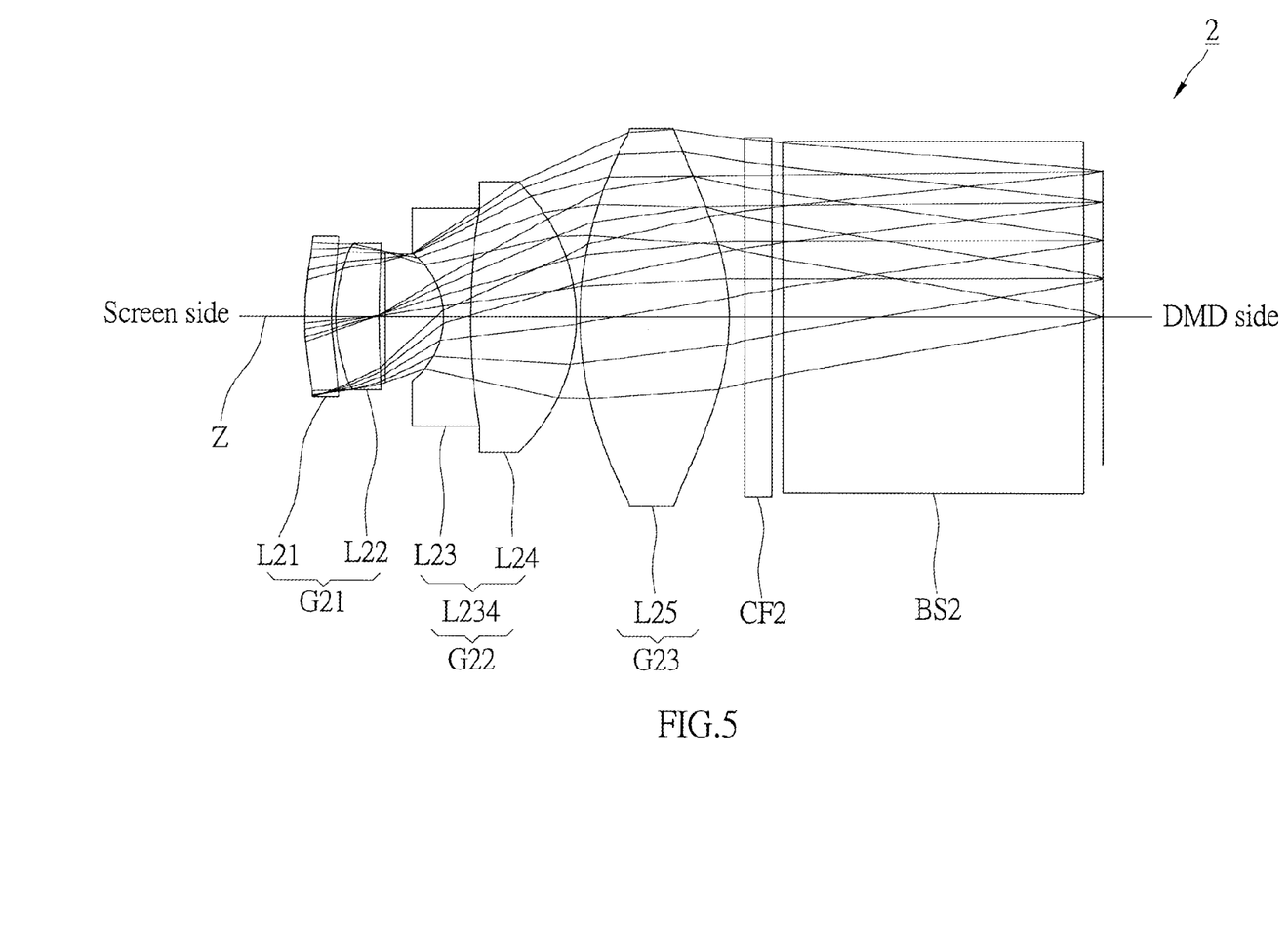
FIG. 5 is a sketch diagram of light path of the second preferred embodiment of the present invention.

As shown in FIG. 4 and FIG. 5, a micro-projection lens 2 of the second preferred embodiment of the present invention includes, along an optical axis Z from a screen side to a light modulator (DMD) side, a first lens group G21, an aperture STO2, a second lens group G22, a third lens group G23, a color filter CF2, and a beam splitter BS2, in which the first lens group G21 has positive refractive power, the second lens group G22 has negative refractive power, and the third lens group G23 has positive refractive power.

The first lens group G21 includes a first lens L21 and a second lens L22. The first lens L21 is a plastic, aspheric, and meniscus lens with negative refractive power. The first lens L21 has a convex surface S1 and a concave surface S2, and both of them are aspheric. The second lens L22 is a plastic, aspheric, and meniscus lens with positive refractive power. The second lens L12 has a convex surface S32 and a concave surface S4, and both of them are aspheric. The second lens L12 leads the positive refractive power of the first lens group G11. The first lens L11 and the second lens L12 further have the following condition to improve image quality and reduce chromatic aberration:

$0.4 < f2/F12 < 0.95$ wherein:
f2: effective focus length of the second lens L22; and
F12: composite focus length of the first lens L21 and the second lens L22.

The second lens group G22 includes a third lens L23 and a fourth lens L24. The third lens L23 is a glass lens with negative refractive power, and the fourth lens L24 is a glass lens with positive refractive power. The third lens L23 and the fourth lens L24 are bonded together to form a doublet L234 with negative refractive power. The doublet L234 has the following condition to reduce chromatic aberration and beam expansion:

$0.1 < f3/F34 < 0.5$ wherein:
f3: effective focus length of the third lens L23; and
F34: composite focus length of the doublet L234.

The third lens group G23 includes a fifth lens L25, which is a plastic lens with positive refractive power, and both surfaces S9, S10 of which are aspheric. The third lens group G23 may enhance imaging of the first lens group G21 and correct field curvature and astigmatism.

Table 3 shows focus length (F), F-number (Fno), radius of curvature of the lens at the optical axis (R), thickness of the lens at the optical axis (T), refractive index (Nd), and the Abbe number (Vd) of the micro-projection lens 2 of the second preferred embodiment:

TABLE 3

F = 1 mm Fno = 1.87

| Surface | R(mm) | T(mm) | Nd | Vd | Note |
|---|---|---|---|---|---|
| OBJ | ∞ | 123 | | | |
| S1 | 1.0402 | 0.0959 | 1.5312 | 56.0438 | L21 |
| S2 | 0.6758 | 0.0137 | | | |
| S3 | 0.4829 | 0.1534 | 1.607 | 27 | L22 |
| S4 | 2.2343 | 0.022 | | | |
| S5 | 0 | 0.2074 | | | STO2 |
| S6 | −0.286 | 0.0959 | 1.8467 | 23.7779 | L234 |
| S7 | 2.3327 | 0.3749 | 1.8348 | 42.7137 | |
| S8 | −0.6664 | 0.0137 | | | |
| S9 | 1.1673 | 0.53 | 1.5312 | 56.0438 | L25 |
| S10 | −0.867 | 0.0548 | | | |
| S11 | 0 | 0.0959 | 1.5069 | 29.0329 | CF2 |
| S12 | 0 | 0.0411 | | | |
| S13 | 0 | 1.0685 | 1.544 | 56.2 | BS2 |
| S14 | 0 | 0 | | | |

In the present embodiment, the depths of aspheric surfaces S1, S2, S3, S4, S9, and S10 may be obtained by the following equation:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

Wherein:
z: depth of aspheric concave surface;
c: reciprocal of radius of curvature;
h: radius of aperture of surface;
k: conic constant; and
A~G: coefficient of the radius of aperture of surface.

Table 4 shows the conic constants k of the aspheric surfaces and the coefficients A~G of the radius of aperture of surface h:

TABLE 2

| Surface | S1 | S2 | S3 | S4 | S9 | S10 |
|---|---|---|---|---|---|---|
| K | −3.56434 | −12.0594 | −5.5006 | 4.107109 | −2.64746 | 0.100194 |
| A | 0.213774 | −5.33006 | −2.15296 | −1.18515 | −0.04917 | 0.510103 |
| B | −12.8265 | 18.03895 | 33.12787 | −14.3793 | 0.393039 | 0.090766 |
| C | 14.72801 | 283.9151 | 501.4091 | 341.818 | −0.67881 | 0.603814 |
| D | −1270.91 | −2346.93 | −2496.55 | −4770.77 | 0.274208 | −0.99677 |
| E | 19424.1 | 8416.695 | 34986.49 | 41239.42 | 1.429255 | 1.971666 |
| F | −39771.3 | 135996.8 | −116968 | 120959.7 | −1.65382 | 0.164762 |
| G | 3E−07 | 6E−07 | 0 | 0 | 0 | 0 |

With the arrangement of the lenses and the aperture, the micro-projection lens 2 of the second preferred embodiment is small in size and has a good image quality. The detail data are shown in FIG. 6A to FIG. 6C.

Figure 6A:
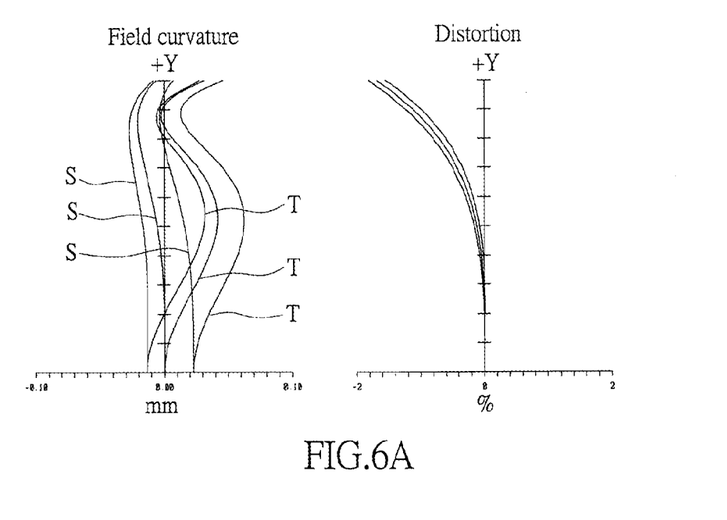
FIG. 6A is a field curvature diagram and a distortion diagram of the second preferred embodiment of the present invention.
Figure 6B:
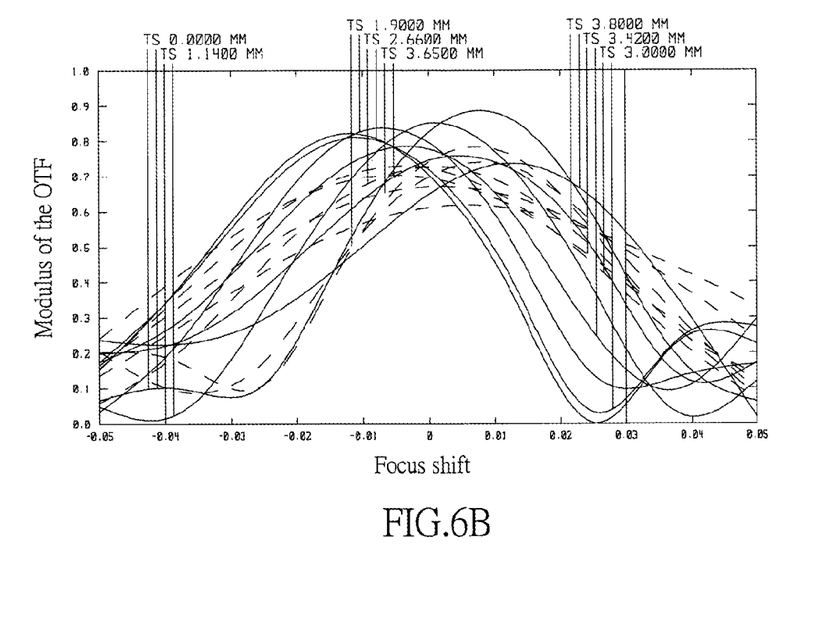
FIG. 6B is a through focus MTF diagram of the second preferred embodiment of the present invention.
Figure 6C:
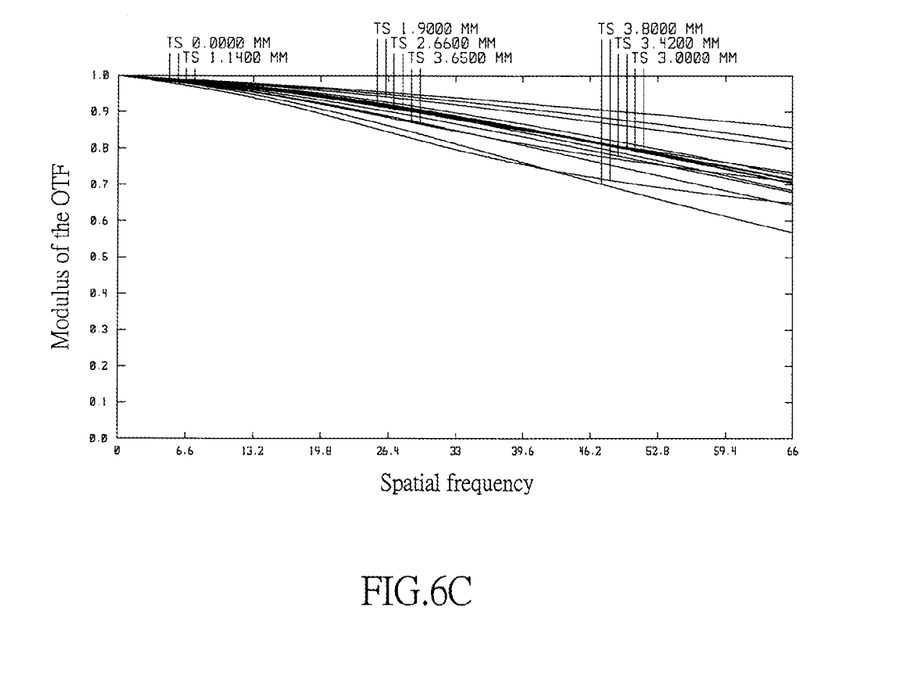
FIG. 6C is a spatial frequency MTF diagram of the second preferred embodiment of the present invention.

FIG. 6A is a field curvature diagram and a distortion diagram of the second preferred embodiment of the present invention; FIG. 6B is a through focus MTF diagram of the second preferred embodiment of the present invention; and FIG. 6C is a spatial frequency MTF diagram of the second preferred embodiment of the present invention. In FIG. 6A, the maximum field curvature is between 0.05 mm and −0.03 mm, and the distortion is under 2%. In FIG. 6B, it shows that the micro-projection lens 1 of the first preferred embodiment has a good resolution from any field of view. In FIG. 6C the spatial frequency MTF still is greater than 40% in 66 lp/mm.

The results show the resolution of the micro-projection lens 2 of the second embodiment of the present invention is qualified.

Figure 7:
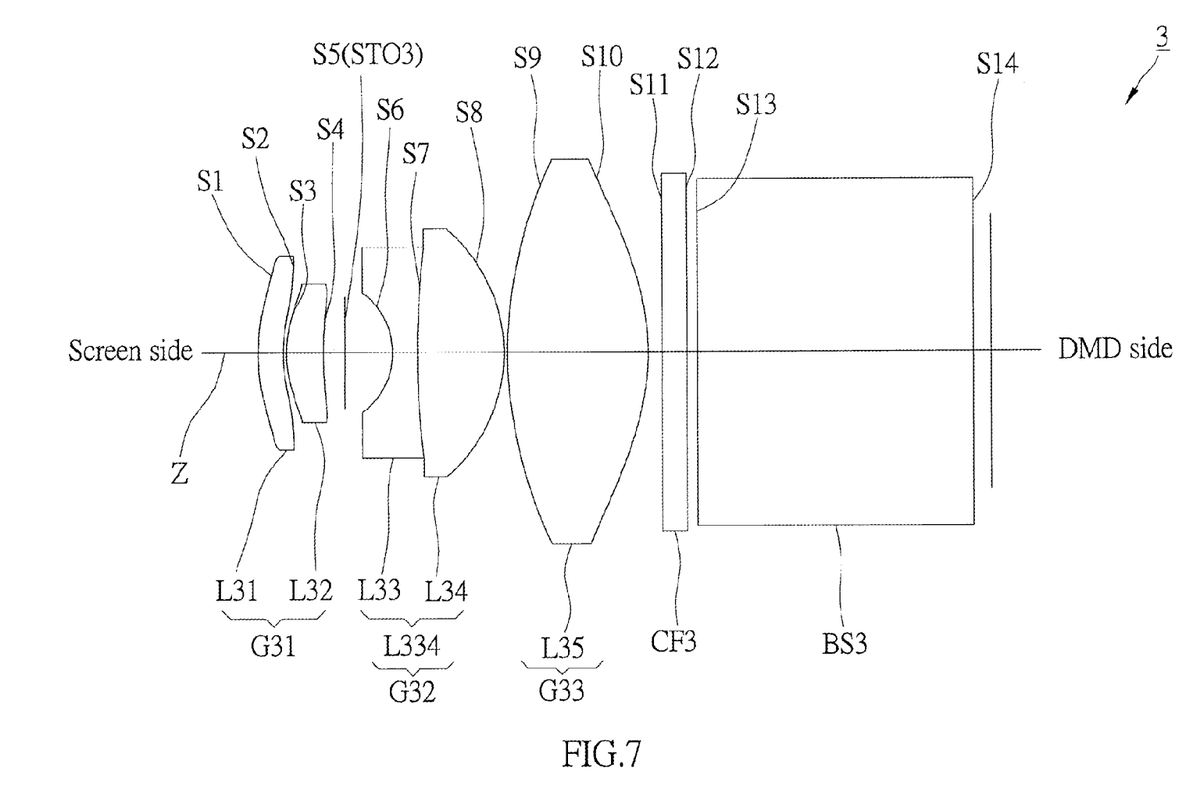
FIG. 7 is a sketch diagram of the arrangement of the lenses of a third preferred embodiment of the present invention.
Figure 8:
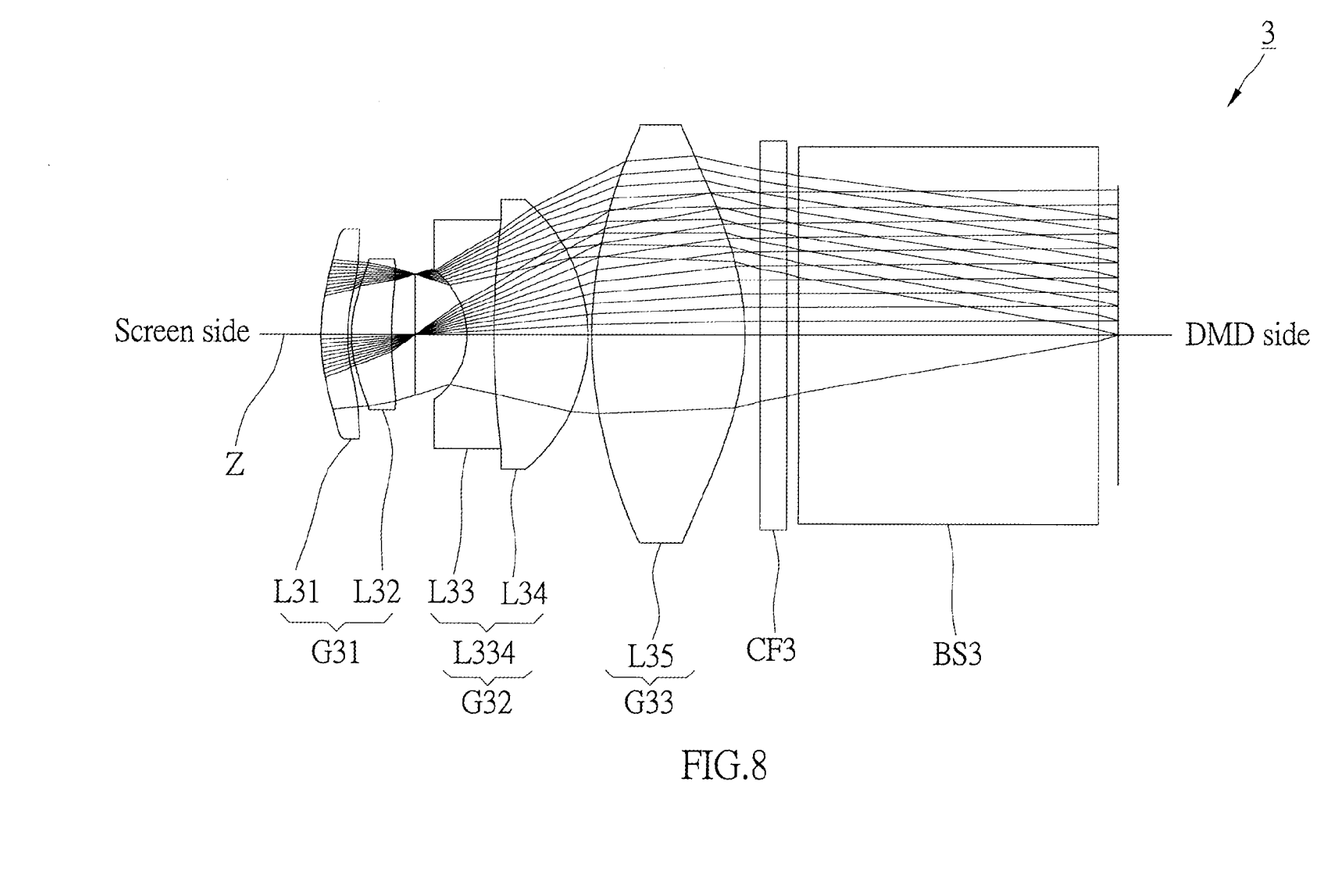
FIG. 8 is a sketch diagram of light path of the third preferred embodiment of the present invention.

As shown in FIG. 7 and FIG. 8, a micro-projection lens 3 of the third preferred embodiment of the present invention includes, along an optical axis Z from a screen side to a light modulator (DMD) side, a first lens group G31, an aperture STO3, a second lens group G32, a third lens group G33, a color filter CF3, and a beam splitter BS3, in which the first lens group G31 has positive refractive power, the second lens group G32 has negative refractive power, and the third lens group G33 has positive refractive power.

The first lens group G31 includes a first lens L31 and a second lens L32. The first lens L31 is a plastic, aspheric, and meniscus lens with negative refractive power, and the second lens L32 is a plastic, aspheric, and meniscus lens with positive refractive power. The first lens L31 and the second lens L32 have a convex surface S1, S3 and a concave surface S2, S4 respectively, and all of them are aspheric. The first lens L31 and the second lens L32 further have the following condition to improve image quality and reduce chromatic aberration:

$$0.4 < f2/F12 < 0.95$$

wherein:
f2: effective focus length of the second lens L32; and
F12: composite focus length of the first lens L31 and the second lens L32.

The second lens group G32 includes a third lens L33 and a fourth lens L34. The third lens L33 is a glass lens with negative refractive power, and the fourth lens L34 is a glass lens with positive refractive power. The third lens L33 and the fourth lens L34 are bonded together to form a doublet L334. The doublet L334 has the following condition to reduce chromatic aberration and beam expansion:

$$0.1 < f3/F34 < 0.5$$

wherein:
f3: effective focus length of the third lens L33; and
F34: composite focus length of the doublet L334.

The third lens group G33 includes a fifth lens L35, which is a plastic lens with positive refractive power, and both surfaces S9, S10 of which are aspheric. The third lens group G33 may enhance imaging of the first lens group G31 and correct field curvature and astigmatism.

Table 5 shows focus length (F), F-number (Fno), radius of curvature of the lens at the optical axis (R), thickness of the lens at the optical axis (T), refractive index (Nd), and the Abbe number (Vd) of the micro-projection lens 3 of the third preferred embodiment:

TABLE 5

| | F = 1 mm Fno = 1.85 | | | | |
|---|---|---|---|---|---|
| Surface | R(mm) | T(mm) | Nd | Vd | Note |
| OBJ | ∞ | 123 | | | |
| S1 | 0.789 | 0.0959 | 1.5312 | 56.0438 | L31 |
| S2 | 0.5283 | 0.0137 | | | |
| S3 | 0.4317 | 0.143 | 1.6073 | 26.6467 | L32 |
| S4 | 1.4137 | 0.0829 | | | |
| S5 | 0 | 0.1842 | | | STO3 |
| S6 | −0.2911 | 0.0959 | 1.8467 | 23.7779 | L334 |
| S7 | 3.4146 | 0.3338 | 1.7292 | 54.68 | |
| S8 | −0.6402 | 0.0137 | | | |
| S9 | 1.5465 | 0.5438 | 1.7391 | 48.5 | L35 |
| S10 | −0.9715 | 0.0548 | | | |
| S11 | 0 | 0.0959 | 1.5069 | 29.0329 | CF3 |
| S12 | 0 | 0.0411 | | | |
| S13 | 0 | 1.0685 | 1.544 | 56.2 | BS3 |
| S14 | 0 | 0 | | | |

In the present embodiment, the depths of aspheric surfaces S1, S2, S3, S4, S9, and S10 may be obtained by the following equation:

$$z = \frac{ch^2}{1 + [1 - (k+1)c^2h^2]^{\frac{1}{2}}} + Ah^4 + Bh^6 + Ch^8 + Dh^{10} + Eh^{12} + Fh^{14} + Gh^{16}$$

Wherein:
z: depth of aspheric concave surface;
c: reciprocal of radius of curvature;
h: radius of aperture of surface;
k: conic constant; and
A~G: coefficient of the radius of aperture of surface.

Table 4 shows the conic constants k of the aspheric surfaces and the coefficients A~G of the radius of aperture of surface h:

TABLE 2

| Surface | S1 | S2 | S3 | S4 | S9 | S10 |
|---|---|---|---|---|---|---|
| K | −0.90216 | −6.39031 | −3.03047 | 8.657106 | 1.563867 | −0.94629 |
| A | 0.610119 | −3.41104 | −2.96236 | −1.14883 | −0.19942 | 0.208831 |
| B | −22.4022 | 9.967173 | 28.63137 | −14.7804 | 0.208593 | −0.1448 |
| C | 76.66628 | 7.92587 | 12.72461 | 731.8631 | −0.23694 | 0.926912 |
| D | −1034.08 | −1160.34 | −5208.74 | −13205 | −0.43429 | −8.52795 |
| E | −15770.5 | 30244.92 | 8880.979 | 33765.55 | 11.32075 | 3.436411 |
| F | 222201.5 | 489454.2 | 849961.4 | 425232.8 | −0.99945 | −2.7541 |
| G | −533657 | −3399486 | −6437981 | −1516959 | 0 | 0 |

Figure 9A:
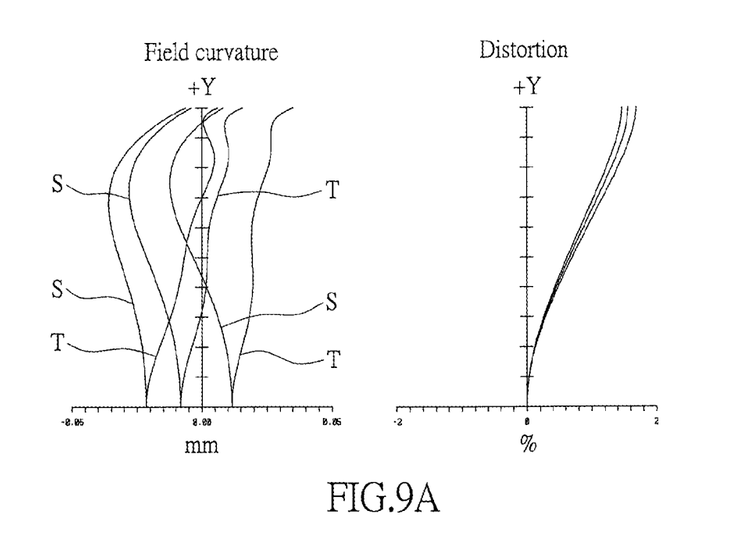
FIG. 9A is a field curvature diagram and a distortion diagram of the third preferred embodiment of the present invention.
Figure 9B:
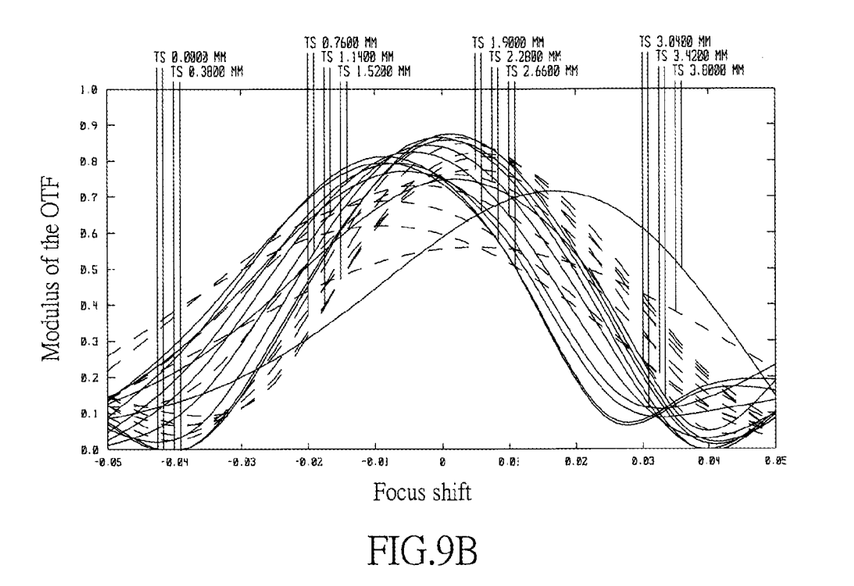
FIG. 9B is a through focus MTF diagram of the third preferred embodiment of the present invention.
Figure 9C:
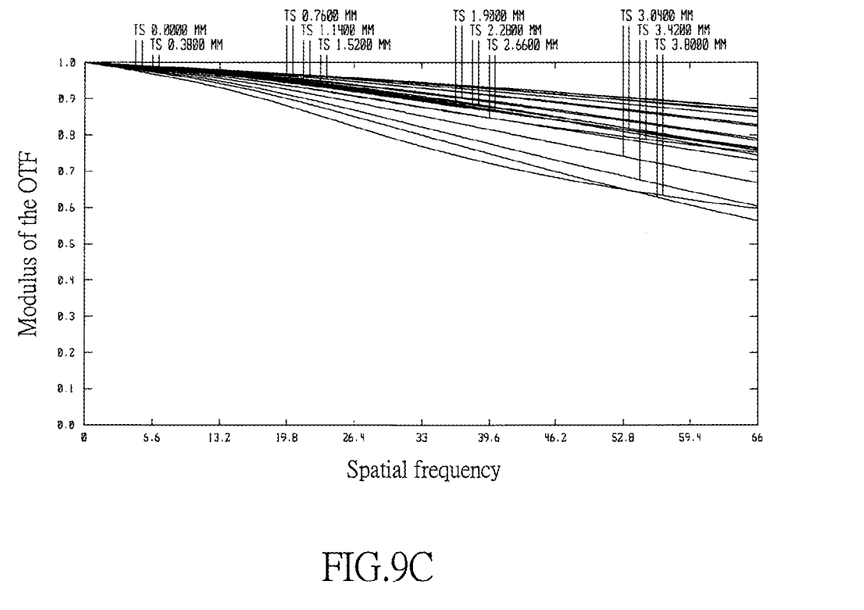
FIG. 9C is a spatial frequency MTF diagram of the third preferred embodiment of the present invention.

With the arrangement of the lenses and the aperture, the micro-projection lens 2 of the second preferred embodiment is small in size and has a good image quality. The detail data are shown in FIG. 9A to FIG. 9C.

FIG. 6A is a field curvature diagram and a distortion diagram of the third preferred embodiment of the present invention; FIG. 9B is a through focus MTF diagram of the third preferred embodiment of the present invention; and FIG. 9C is a spatial frequency MTF diagram of the third preferred embodiment of the present invention. In FIG. 9A, the maximum field curvature is between 0.04 mm and −0.04 mm, and the distortion is under 2%. In FIG. 9B, it shows that the micro-projection lens 1 of the first preferred embodiment has a good resolution from any field of view. In FIG. 9C the spatial frequency MTF still is greater than 50% in 66 lp/mm. The results show the resolution of the micro-projection lens 2 of the second embodiment of the present invention is qualified.

In conclusion, the micro-projection lens of the present invention has a small size and a good image quality. It meets the requirements of the micro-projector.

The description above is a few preferred embodiments of the present invention and the equivalence of the present invention is still in the scope of claim construction of the present invention.

What is claimed is:

1. A micro-projection lens comprising first lens group, a second lens group, and a third lens group arranged in sequence along an optical axis from a screen side to a light modulator side; the first lens group having positive refractive power and including at least an aspheric lens; the second lens group having negative refractive power and including at least a glass tablet; the third lens group having positive refractive power and including at least an aspheric lens wherein the first lens group includes a first lens and a second lens, and has a limitation of 0.4<f2/F12<0.95, wherein the f2 is an effective focus length of the second lens and F12 a composite focus length of the first lens and the second lens.

2. The micro-projection lens as defined in claim 1, wherein the first lens group includes a first lens having negative refractive power and a second lens having positive refractive power.

3. The micro-projection lens as defined in claim 1, wherein the first lens group includes a first lens and a second lens, and both of the first lens and the second lens are plastic aspheric lenses.

4. The micro-projection lens as defined in claim 1, wherein the second lens group includes a third lens having negative refractive power and a fourth lens having positive refractive power.

5. The micro-projection lens as defined in claim 1, wherein the third lens group has a fifth lens, and both surfaces of the fifth lens are aspheric.

6. The micro-projection lens as defined in claim 1, further comprising an aperture between the first lens group and the second lens group.

7. A micro-projection lens comprising first lens group, a second lens group, and a third lens group arranged in sequence along an optical axis from a screen side to a light modulator side; the first lens group having positive refractive power and including at least an aspheric lens; the second lens group having negative refractive power and including at least a glass tablet; the third lens group having positive refractive power and including at least an aspheric lens wherein the second lens group includes a third lens and a fourth lens, and the third lens and the fourth lens are bonded together to form the tablet, and the tablet has a limitation of 0.1<f3/F34<0.5, wherein the f3 is an effective focus length of the third lens and F34 a composite focus length of the third lens and the fourth lens.

8. The micro-projection lens as defined in claim 7, wherein the first lens group includes a first lens having negative refractive power and a second lens having positive refractive power.

9. The micro-projection lens as defined in claim 7, wherein the first lens group includes a first lens and a second lens, and both of the first lens and the second lens are plastic aspheric lenses.

10. The micro-projection lens as defined in claim 7, wherein the second lens group includes a third lens having negative refractive power and a fourth lens having positive refractive power.

11. The micro-projection lens as defined in claim 7, wherein the third lens group has a fifth lens, and both surfaces of the fifth lens are aspheric.

12. The micro-projection lens as defined in claim 7, further comprising an aperture between the first lens group and the second lens group.

\* \* \* \* \*